United States Patent [19]
Hunt

[11] 3,949,659
[45] Apr. 13, 1976

[54] APPARATUS FOR PROCESSING MEAT
[76] Inventor: David F. Hunt, 2429 Poplar Lane, Lafayette, Ind. 47905
[22] Filed: June 4, 1973
[21] Appl. No.: 366,349

[52] U.S. Cl. ................................. 99/348; 99/410
[51] Int. Cl.$^2$ ..................................... A47J 27/18
[58] Field of Search ............ 99/348, 313, 355, 403, 99/410, 446; 100/110, 116

[56] References Cited
UNITED STATES PATENTS

| | | | |
|---|---|---|---|
| 2,001,352 | 5/1935 | Princiotta | 99/410 |
| 2,068,013 | 1/1937 | Fridlender et al. | 100/116 X |
| 2,139,542 | 12/1938 | Finlayson et al. | 100/116 X |
| 2,423,329 | 7/1947 | LeClair | 99/403 UX |
| 3,137,228 | 6/1964 | Elow | 100/116 X |
| 3,159,095 | 12/1964 | Wagner | 99/403 X |
| 3,200,737 | 8/1965 | Ferenc | 99/355 |
| 3,411,433 | 11/1968 | Christopher | 99/446 |
| 3,592,668 | 7/1971 | Denk | 99/355 X |
| 3,739,710 | 6/1973 | Costa et al. | 99/348 |

FOREIGN PATENTS OR APPLICATIONS

| | | | |
|---|---|---|---|
| 27,602 | 3/1909 | United Kingdom | 99/348 |
| 807,889 | 6/1951 | Germany | 99/348 |

*Primary Examiner*—Stanley N. Gilreath
*Assistant Examiner*—Arthur O. Henderson

[57] ABSTRACT

A method and apparatus is disclosed for processing meat which includes cooking meat, separating rendered fat from the cooked meat, and then removing fat while maintaining the cooked meat separated therefrom. The apparatus includes a cooking receptacle into which a perforated member may be inserted, the perforated member being of a size to have its periphery adjacent to the sidewalls of the cooking receptacle when the perforated member is properly positioned within the cooking receptacle. Drive means is provided to displace the perforated member downwardly into the cooking receptacle (after cooking of the meat and positioning of the perforated member within the cooking receptacle) so that the cooked meat is forced toward the bottom of the cooking receptacle and rendered fat passes through the perforations in the perforated member to thus separate the cooked meat from rendered fat. While maintaining the cooked meat and rendered fat so separated, the separated rendered fat is removed from the cooking receptacle by pumping the same therefrom or, alternately, by tilting the cooking receptacle to pour the separated fat from the open top of the cooking receptacle. The perforated member is displaced by rotation of a threaded shaft or, alternately, by longitudinally displacing a driven shaft. In addition, a pressure application control may be provided so that a predetermined pressure is applied to the perforated member whereby a predetermined percentage of rendered fat is consistantly removed from the cooked meat.

10 Claims, 8 Drawing Figures

APPARATUS FOR PROCESSING MEAT

FIELD OF THE INVENTION

This invention relates to a processing apparatus, and, more particularly, relates to an apparatus for processing meat which includes separating and removing rendered fat from cooked meat.

BACKGROUND OF THE INVENTION

In processing various products, it is oftentimes necessary to treat the product and, in so doing, a mixture of solid state and liquid state materials are produced which are preferably to be separated from one another before the liquid state material is removed from the treating area. Such is the case, for example, where certain meats, such as ground meats, are cooked and rendered fat then removed.

In order to cook certain meats, such as ground meat, for example, a cooking receptacle has commonly been utilized wherein the meat when cooked is mixed with rendered fat. The fat in such a cooking receptacle is normally first removed from the receptacle with the cooked meat then being thereafter removed. It has been found, however, that such fat cannot be simply pumped from the cooking receptacle since cooked meat is likewise pumped from the receptacle in undesired quantities.

It has therefore been the more common practice heretofore to remove such fat from the cooking receptacle by fastening a perforated cover to the open top of the cooking receptacle and then tilting the receptacle to pour the fat from the receptacle. While the fat may be thus removed from the cooking receptacle, such practice has been found to have certain disadvantages, such as, for example, by requiring a relatively long period of time for draining of the fat from the tilted receptacle (including passing at least part of the fat through the cooked meat), causing undesirable splashing in some cases when the fat is poured from the cooking receptacle, and/or not permitting practical control of the percentage of fat removed.

SUMMARY OF THE INVENTION

The apparatus of this invention provides for separation of liquid and solid state materials from one another prior to removal of liquid state materials from a treating area, and, more particularly provides for separation of cooked meat from rendered fat prior to removal of rendered fat from the cooking receptacle. By so separating cooked meat from rendered fat, the separated rendered fat may then be quickly removed from the cooking receptacle and time consuming draining of the fat through the cooked meat is eliminated. In addition, a controlled pressure can be applied to the separating device so that a substantially controlled percentage of fat may be consistently removed to thus enhance product quality.

It is therefore an object of this invention to provide an improved apparatus for processing substances which includes separation of liquid and solid state materials.

It is another object of this invention to provide an improved apparatus for processing meat which includes separating rendered fat from the cooked meat prior to removal of the separated rendered fat from the cooking receptacle.

It is yet another object of this invention to provide an improved apparatus for processing meat in which undesirable splashing of rendered fat is eliminated in removing rendered fat from the cooked meat.

It is another object of this invention to provide an improved apparatus for processing meat which includes consistently removing a predetermined percentage of fat from the cooked meat.

It is another object of this invention to provide an improved apparatus for separating cooked meat from rendered fat which includes utilization of a perforated separating member.

It is still another object of this invention to provide an improved apparatus for separating cooked meat from rendered fat which includes applying a predetermined pressure to a perforated member to enable consistent removal of a predetermined percentage of fat from the cooking receptacle.

It is yet another object of this invention to provide an improved separation device for separating rendered fat from cooked meat.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiments of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DETAILED DESCRIPTION OF THE INVENTION

Figure 1:
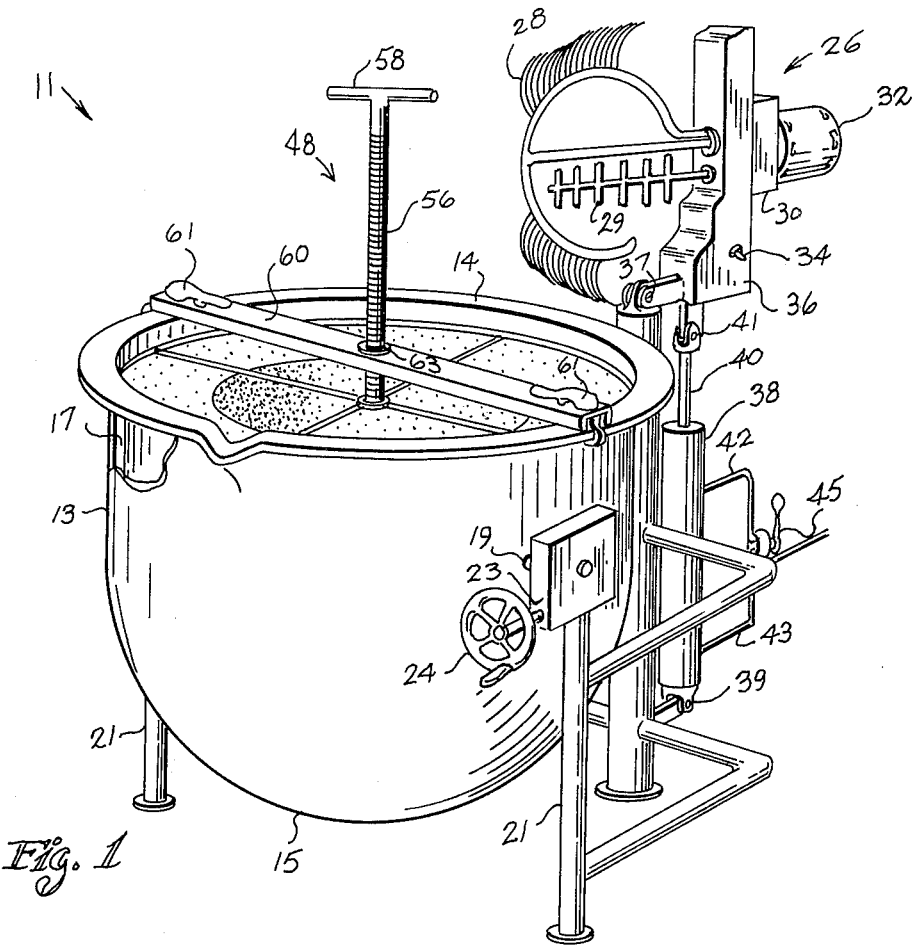
FIG. 1 is a perspective view of the meat processing device of this invention including separating and agitating means.

Referring now to the drawings in which like numerals have been used for like characters, the numeral 11 refers generally to the processing, or treating, apparatus of this invention. As shown, the apparatus includes a cooking receptacle, or kettle, 13, which kettle may include a lip, or upper edge portion, 14 defining an open top with sidewalls extending downwardly therefrom to the bottom portion 15 of the kettle. While kettle 13 is shown to be of generally hemispherical shape, it is to be appreciated that the dimensions of such a kettle may be chosen as deemed desirable for the particular purpose. As shown in FIG. 1, receptacle 13 may have inner and outer sidewalls to form a steam jacket 17 therebetween, as is conventional, to provide for cooking of meat within the receptacle when steam is conventionally supplied thereto. It is to be appreciated, however, that other conventional means could be utilized for cooking of the meat without departing from the intended scope of the invention.

As shown in FIG. 1, receptacle 13 may be positioned by use of pivot pins 19 which extend from the sidewalls of the kettle outwardly so as to be received in mounts 20, which mounts are connected to floor support 21. Where the receptacle is to be tilted or made tiltable as desired, pivot pins 19 are, of course, received in mounts 20 so that the pins are free to pivot therein as, for example, by being received in bearings (not shown). Kettle 13 may be tilted by use of a conventional linkage drive 23 which is attached to a wheel 24 rotation of which causes rotation of pivot pin 19 in conventional fashion to cause the kettle 13 to be tilted (kettle 13 could also be tilted manually, if desired, in which case the linkage drive 23 and wheel 24 could be eliminated). If desired, a stop (not shown) may be provided to assure that the kettle remains in a level position except when wheel 24 is rotated to specifically cause tilting of the kettle 13.

Figure 4:
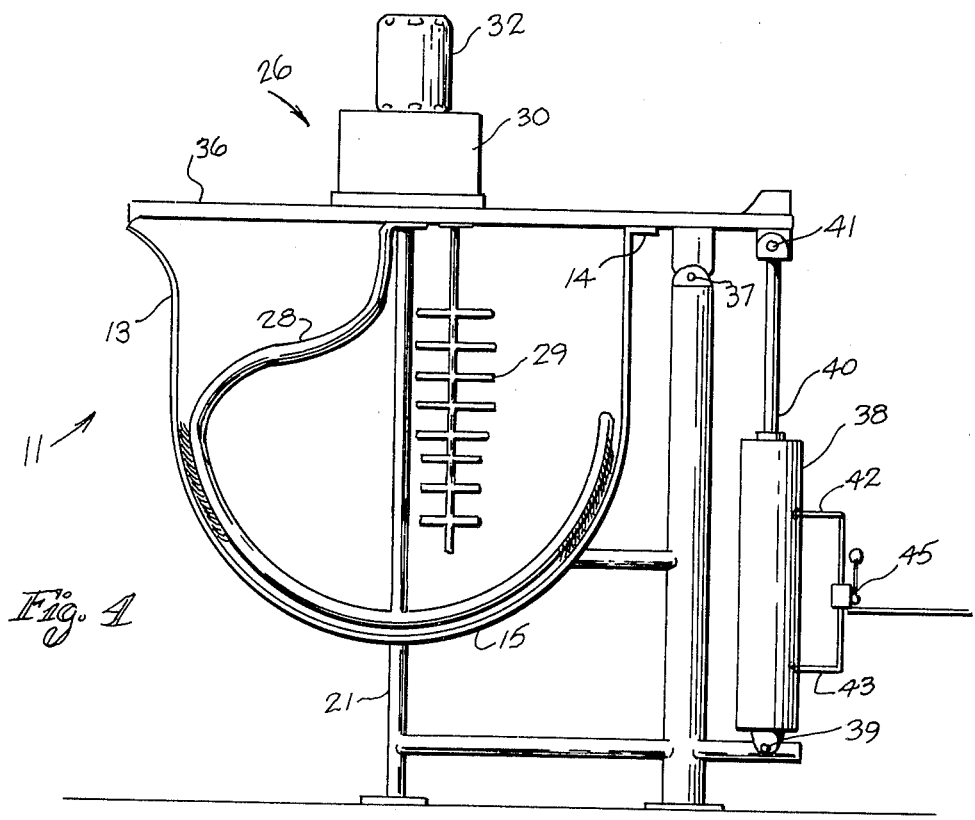
FIG. 4 is a side sectional view of a cooking receptacle as shown in FIG. 1 with the agitator means (utilized during cooking) in place therein, said agitator means being shown in a raised, or removed, position in FIG. 1 so that the separation means can be positioned in the cooking receptacle.
Figure 2:
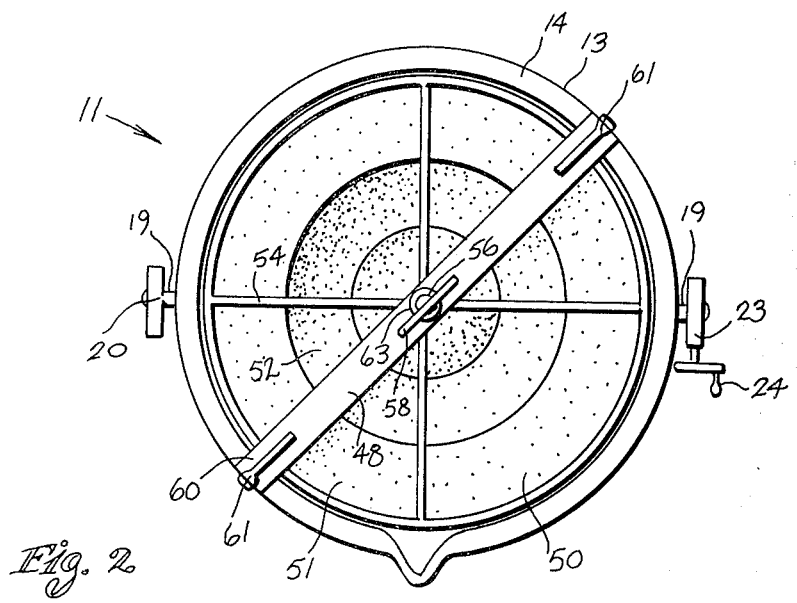
FIG. 2 is a top view of a cooking receptacle as shown in FIG. 1 with separation means in place thereon.
Figure 3:
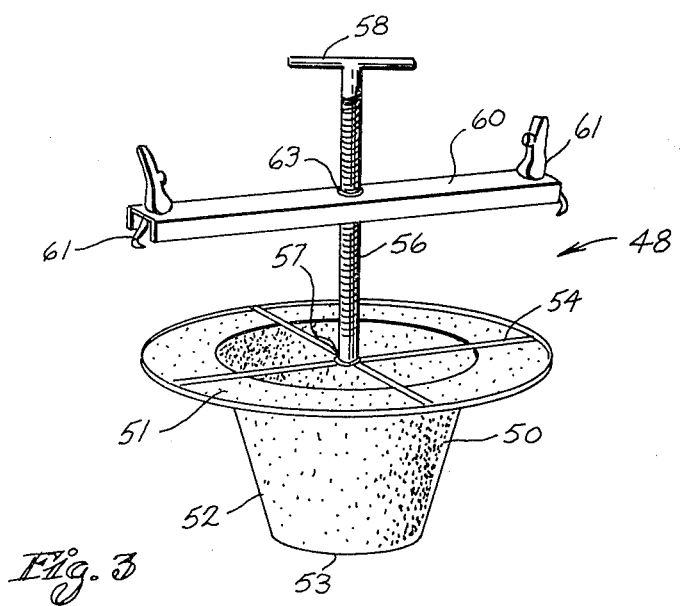
FIG. 3 is a perspective view of the separation means, or device, of this invention.

During cooking of the meat in the cooking receptacle, an agitator 26 is preferably provided. As shown in FIG. 1, the agitator is removeable to allow for separation of cooked meat and rendered fat. As shown in FIG. 4, the agitator includes a scraper element 28 which, when in place in the cooking receptacle, has its lower section adjacent to the inner wall of the cooking receptacle. The agitator also preferably includes an agitating element 29, as also shown in FIGS. 1 and 4. The agitating and scraper elements are connected through gearing 30 to motor 32 to provide for rotation of the scraper and agitator elements as is well known. Operation of motor 32 may be conventionally controlled by means of a motor control switch 34, and the motor and gearing are attached to motor control mount 36 with the scraper and agitating elements extending below mount 36 so as to extend within the cooking receptacle when in the lowered, or in place, position, as best shown in FIG. 4. Mount 36 is illustrated other than in scale in FIG. 1, but, as shown in FIG. 4, preferably extends across the top of kettle 13 when in lowered position. In addition, while mount 36 may include shoulders as indicated in FIG. 1, it is not necessary, as indicated in FIG. 4.

As shown in FIGS. 1 and 4, agitator 26 is positioned within the cooking receptacle during cooking of the meat and is then withdrawn from the cooking receptacle to allow further processing of the meat by separation of the cooked meat from rendered fat. While positioning of the agitator 26 may be done manually, it can also be accomplished by a mechanical arrangement, as shown in FIG. 1, by providing a pivot 37 on mount 36, and providing a piston 38 pivoted at one end by means of pivot 39 (attached to frame 21) and having the piston rod extending a pivot connection 41 attached to mount 36 outwardly of pivot 37, as shown best in FIG. 4. Lines 42 and 43 extend to a control valve 45 which may be connected with a conventional source of actuation pressure, such as water or air for example, to drive the piston in conventional fashion to cause agitator 26 to assume either the raised position, as shown in FIG. 1, or the lowered, or in place, position, as shown in FIG. 4.

After the meat is cooked, it is necessary to separate rendered fat from the cooked meat. While portions of the cooked meat may settle to the bottom of the kettle 13 after termination of agitation applied during cooking, portions of the cooked meat will remain suspended, or mixed, in the rendered fat and must be separated to prevent loss of undesirable qantities of cooked meat. As shown in FIGS. 1, 2, 3 and 5 through 8, a separation device is provided to assure positive separation of the cooked meat from rendered fat while still in cooking receptacle 13.

The separation device, or accessory, 48, includes a perforated pan, or member, 50 which includes an upper lip, or peripheral, portion the outer edges of which extend to a position adjacent to the sidewalls of the receptacle when in place in cooking receptacle 13, as shown best in FIGS. 2 and 5 through 8. Perforated member, or pan, 50 also includes a lower downwardly extending perforated sidewall portion 52 and a bottom portion 53. While shown as a pan, it is to be appreciated, however, that perforated member 50 may take other forms as desired without departing from the intended scope of the invention.

A pair of rods, or arms, 54 are attached to the periphery of the perforated member 50 and more particularly to the upper portion 51 thereof. Rods 54 are connected to shaft 56 at shaft journal point 57 in conventional fashion and if desired can be journalled to the shaft for free rotation with respect to the shaft. As shown best in FIG. 3, shaft 56 has a portion thereof threaded and may terminate at its upper end in a handle 58 for permitting rotation of the shaft.

Support, or channel, 60 extends a sufficient length so that clamps 61 may be attached to opposite sides of the top or lip of kettle 13 to position the separation device on the kettle. A central aperture 63 is provided in support 60 which aperture is threaded to receive and mate with threaded shaft 56 so that when handle 58 is rotated shaft 56 will be longitudinally displaced with respect to support 60. Thus when support 60 is positioned on kettle 13 by means of clamps 61 attached to the lip of the kettle, rotation of shaft 58 in one direction will displace perforated member 50 downwardly into the kettle 13 (and when rotated in the opposite direction will, of course, displace the perforated member upwardly from the bottom of kettle 13).

Figure 5:
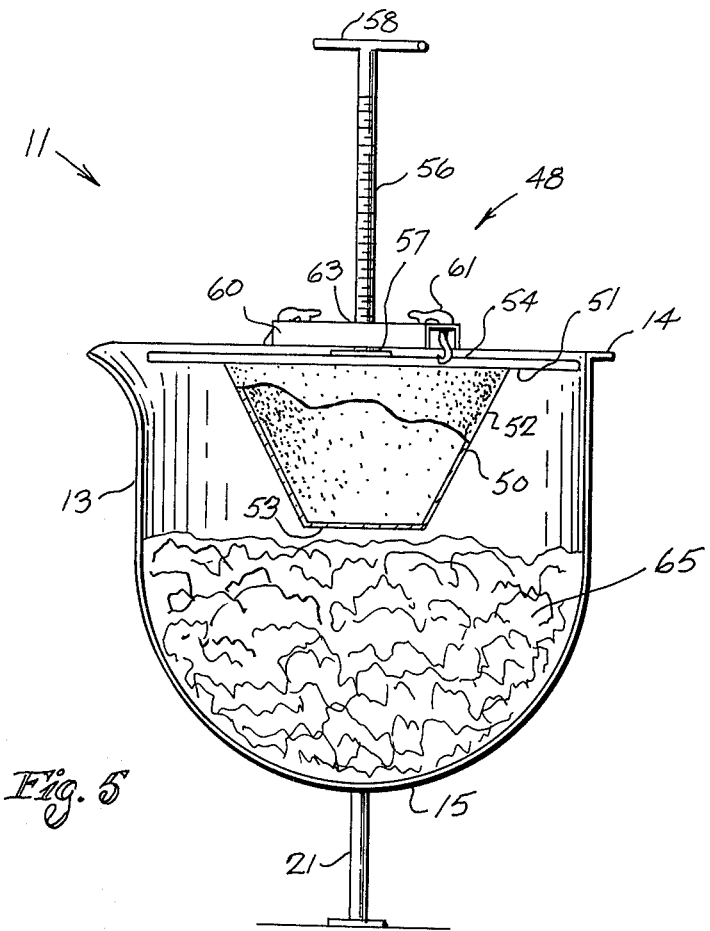
FIG. 5 is a cutaway side view of a cooking receptacle as shown in FIG. 1 with the separation device positioned therein in a raised position.
Figure 6:
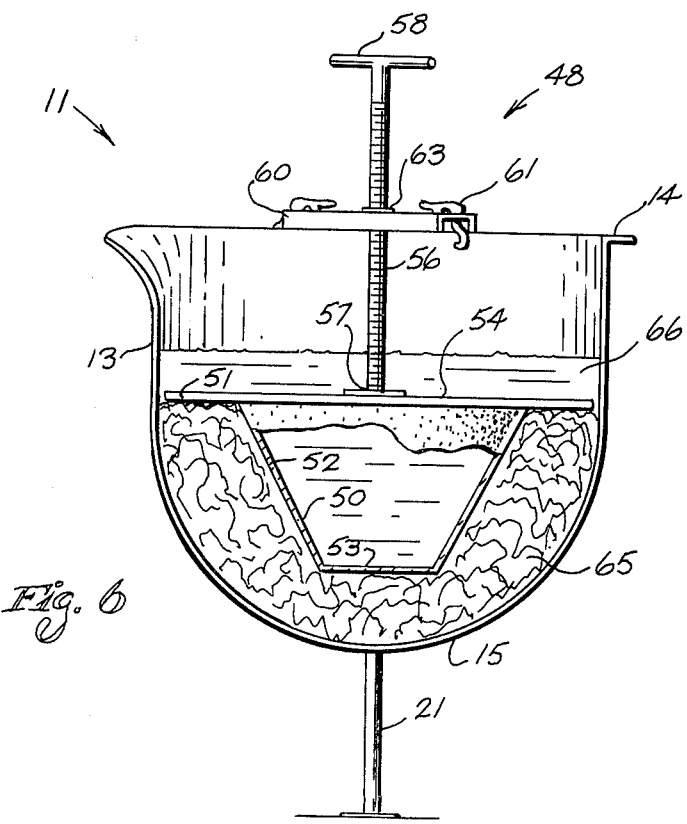
FIG. 6 is a cutaway side view of a cooking receptacle as shown in FIG. 1 with the separation device of this invention displaced downwardly from the raised position as shown in FIG. 5 to thus separate cooked meat from rendered fat.

As shown in FIG. 5, the perforated member is in the uppermost, or raised, position with the support 60 shown attached to kettle 13. Rotation of handle 58 then causes displacement of the perforated member downwardly to the position as shown in FIG. 6 wherein cooked meat 65 is forced toward the bottom of kettle 13 and rendered fat 66 passes through the perforations in the perforated member and thus is separated from the cooked meat. The perforations in perforated member 50 are of a size to allow rendered fat, or other liquid state material, to pass through the perforated member and hence to the upper portion of the kettle 13 while the perforations are of sufficiently small size to prohibit the cooked meat, or other solid state material, from passing therethrough and hence the cooked meat is forced to the bottom of the kettle and is retained there so long as the separation device is in place in a lowered position.

Figure 8:
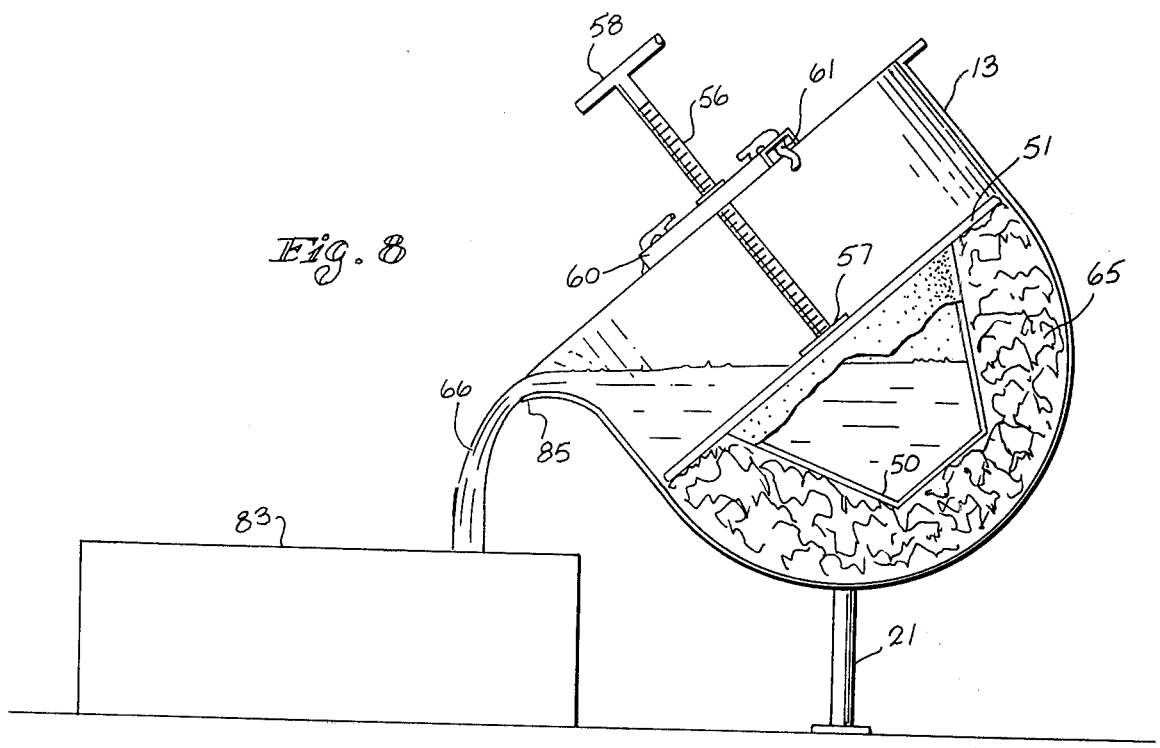
FIG. 8 is a cutaway side view of the cooking receptacle as shown in FIG. 1 with the separation means depressed to maintain cooked meat separated from rendered fat and showing the cooking receptacle tilted to pour separated rendered fat from the cooking receptacle while the cooked meat is retained so separated by 3,949,659 the separation means.
Figure 7:
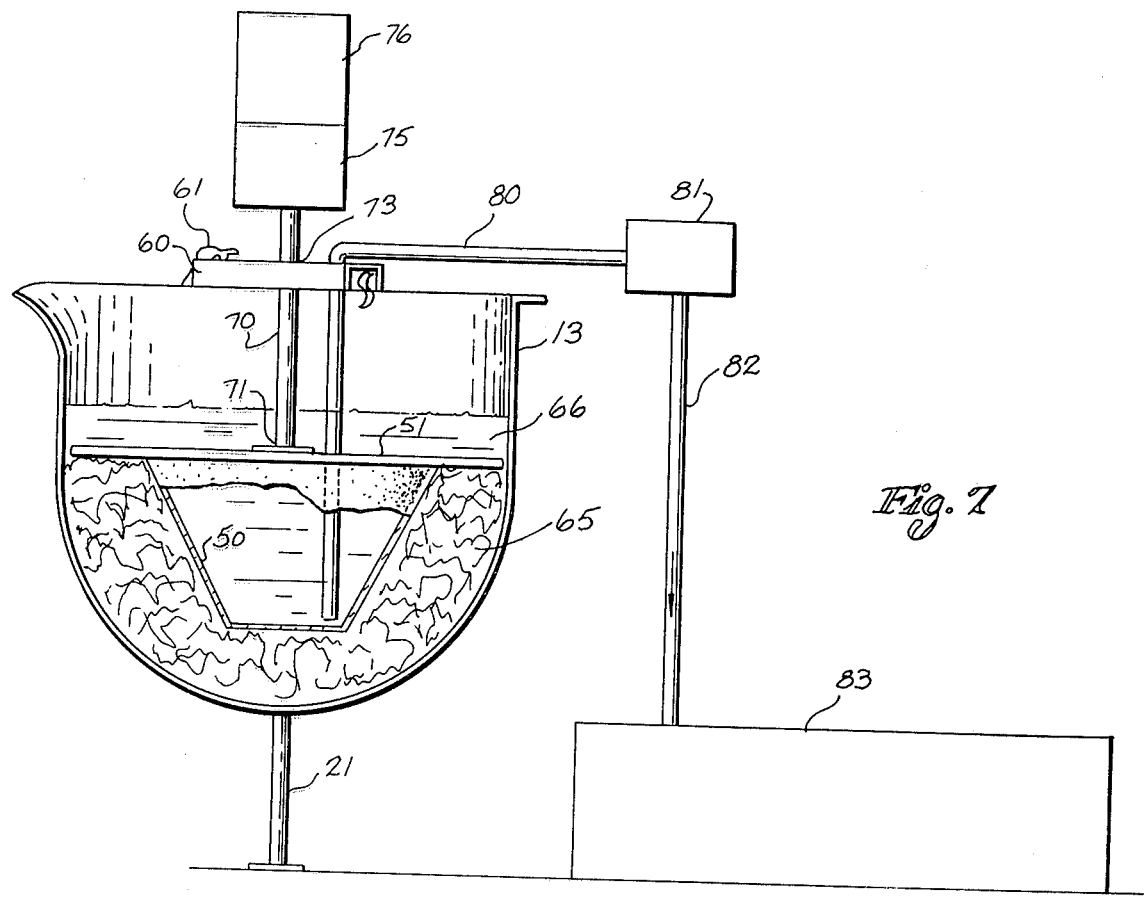
FIG. 7 is a cutaway side view of a cooking receptacle as shown in FIG. 1 with an alternate embodiment of the separation means shown therein in a depressed position so that cooked meat is maintained separated from rendered fat and including pumping means for removing separated rendered fat from the cooking receptacle.

After separation of rendered fat from the cooked meat, the separation device is preferably retained in place until after the separated rendered fat is removed from the cooking receptacle. As shown in FIG. 7, this may be accomplished by means of a pump, which is preferable, or the rendered fat may, as shown in FIG. 8, be poured from the kettle by tilting the kettle.

An alternate embodiment of the separation device is shown in FIG. 7 wherein perforated member 50 is attached to a driven shaft 70 which is connected to perforated member 50 at junction 71, with the shaft extending through aperture 73 in support 60 to a conventional pressure application control 75 and motor 76. Hence motor 76 applies a predetermined pressure to displace shaft 73 longitudinally and hence to displace the perforated member into the kettle 13 under a predetermined pressure to thus repeatedly and consistently separate rendered fat from cooked meat. The application of a predetermined pressure is advantageous in that a predetermined percentage of rendered fat may be repeatedly and consistently removed from the cooked meat to thus enhance product quality.

As shown in FIG. 7 and as brought out hereinabove, the separated rendered fat is preferably removed through line 80 connected with pump 81, the rendered fat being then conducted through line 82 to storage receptacle 83. As shown in FIG. 8, an alternate method is to tilt the kettle 13 and pour the separated fat 66 therefrom. If the rendered fat is to be poured from the kettle, a pouring lip 85 is preferably provided in the kettle as indicated in FIG. 8.

In operation, the meat, commonly ground meat, is inserted into the kettle 13 and the meat then conventionally cooked by means of steam, or other suitable heating means, with the agitator 26 in place to maintain agitation of the meat. During cooking, liquid and solid state materials are formed which in the case of ground meat would be solid cooked meat and rendered fat. After the meat is cooked, the agitator is removed and the separation device then placed in the cooking receptacle. The perforated member is then depressed, or displaced downwardly, either by rotation of the handle 58 (or by means of a motor in the alternate embodiment) to separate the ground meat from rendered fat while still in the receptacle. The separated rendered fat may then be quickly and readily removed either by pumping the fat from the kettle, which is preferable, or by tilting the kettle and pouring the fat therefrom (as indicated in an alternate embodiment). It is to be noted that no drainage time is necessary since the cooked meat is maintained separated from rendered fat.

By applying a predetermined pressure to the perforated member to control displacement thereof a controlled percentage of rendered fat may be consistently separated and removed. Where activated by a motor, such as a piston for example, a controlled amount of pressure may be conventionally applied to the piston to thus control displacement of the perforated member. In the case of the threaded shaft, for example, controlled pressure may be applied by a conventional torque control device such as a torque wrench.

In a working embodiment of this invention, it has been found that rendered fat may be separated and removed from the cooking kettle within three to five minutes where conventional methods utilizing draining require about twenty to twenty-five minutes after the kettle is tilted to sufficiently remove rendered fat from cooked meat. In addition, utilization of a pump for removal of separated rendered fat is made practical by this invention to thus promote clean and sanitary conditions.

It is to be appreciated that the kettle may be of any satisfactory size sufficient to hold the quantity of material to be handled at any particular time, and the agitator and separation device must be dimensioned accordingly, for example, a thirty inch diameter kettle (preferably of stainless steel) best utilizes a separation device screw shaft of about eighteen inches in length in order to reach sufficiently into the kettle to provide for proper separation of cooked meat from rendered fat.

From the foregoing, it should be realized that this invention provides an improved apparatus and method for separating liquid and solid state materials and more particularly provides an improved method and apparatus for separating cooked meat from rendered fat to thus enhance quality and consistency of product while greatly reducing time demands during processing.

What is claimed is:

1. Apparatus for processing meat, said apparatus comprising: an upright cooking receptacle for receiving meat to be cooked; means for causing said meat to be cooked in said cooking receptacle to form a mixture of cooked meat and fat; and separating means within said cooking receptacle to separate said cooked meat from said fat whereby said meat is retained below said separating means and whereby said fat is above said separating means and can thereafter be removed from said cooking receptacle while said meat below said separating means is retained separated from said fat above said separating means in said cooking receptacle.

2. The apparatus of claim 1 wherein said cooking receptacle has an open top, sides and a bottom portion; and wherein said separating means includes a perforated member receivable within said cooking receptacle and being of such width so as to be adjacent to the sides of said cooking receptacle when emplaced within said cooking receptacle, and drive means for moving said perforated member toward the bottom of said cooking receptacle to force cooked meat towards the bottom of said cooking receptacle, said fat passing through said perforated member whereby said fat is separated from said cooked meat and is above said separating means so that said fat may thereafter be readily removed therefrom.

3. The apparatus of claim 2 wherein said drive means includes a mounting member having a screw threaded aperture therein, and a shaft connected with said perforated member and having mating screw threads thereon, whereby rotation of said shaft causes longitudinal displacement thereof.

4. The apparatus of claim 3 wherein said last named means includes a motor connected with said shaft to cause displacement thereof.

5. The apparatus of claim 3 wherein said apparatus includes pressure control means for controlling the amount of pressure applied by said means for longitudinally displacing said shaft.

6. The apparatus of claim 2 wherein said perforated member has a substantially flat peripheral portion and a depressed central portion.

7. The apparatus of claim 2 wherein said apparatus also includes pump means for removing said fat from said cooking receptacle.

8. Apparatus for processing meat, said apparatus comprising: a cooking receptacle having an open top, sides and a bottom portion, said cooking receptacle receiving meat to be cooked and forming a mixture of cooked meat and fat during cooking; a perforated member within said cooking receptacle and having a substantially flat peripheral portion and a depressed central portion, said perforated member being of such width so as to be adjacent to the sides of said cooking receptacle when within said receptacle; a mounting member releasably attached to said receptacle at the top portion thereof, said mounting member having means defining a screw threaded aperture therein; a shaft having mating screw threads therein received within said aperture in said mounting member whereby rotation of said shaft causes longitudinal movement of said shaft in opposite vertical directions, said shaft having one end connected with said perforated member; and an actuator connected with the other end of said shaft to rotate the same, rotation of said shaft in one direction causing said perforated member to be moved toward the bottom portion of said cooking receptacle to force cooked meat toward the bottom of said receptacle below said perforated member with said fat passing through said perforated member whereby said fat is separated from said cooked meat and is above said perforated member so that said fat may thereafter be readily removed from said cooking receptacle.

9. The apparatus of claim 8 wherein said actuator includes handle means whereby the rotational force applied to said shaft may be exerted in a maner such that manual control of the pressure exerted on cooked meat between the perforated member and the cooking receptacle is provided.

10. The apparatus of claim 8 wherein said apparatus includes a first conduit extending into said cooking receptacle and terminating at one end within said depressed portion of said perforated member, a second conduit terminating at one end at a fat storage receptacle, and a pump connected to the other end of each of said conduits for pumping fat from said cooking receptacle to said fat storage receptacle.

* * * * *